US010480775B2

(12) United States Patent
Yamada

(10) Patent No.: US 10,480,775 B2
(45) Date of Patent: Nov. 19, 2019

(54) LIGHT EMITTING DECORATION, METHOD FOR LAYING LIGHT EMITTING DECORATION, LAYING OBJECT AND METHOD FOR FORMING LIGHT EMITTING DESIGN

(71) Applicant: TOYOTA BOSHOKU KABUSHIKI KAISHA, Aichi-ken (JP)

(72) Inventor: Takamasa Yamada, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/964,375

(22) Filed: Apr. 27, 2018

(65) Prior Publication Data
US 2018/0340684 A1 Nov. 29, 2018

(30) Foreign Application Priority Data
May 24, 2017 (JP) .................. 2017-103100

(51) Int. Cl.
*F21V 33/00* (2006.01)
*D03D 15/00* (2006.01)
(Continued)

(52) U.S. Cl.
CPC ........ *F21V 33/00* (2013.01); *B29D 11/00663* (2013.01); *B60Q 3/217* (2017.02);
(Continued)

(58) Field of Classification Search
CPC ..... F21V 33/00; F21V 33/0016; G02B 6/001; D03D 1/00; D03D 15/00; B29D 11/00663;
(Continued)

(56) References Cited

U.S. PATENT DOCUMENTS

2014/0211498 A1   7/2014  Cannon et al.
2015/0062954 A1*  3/2015  Crossland ............. D06P 1/0012
                                          362/552
(Continued)

FOREIGN PATENT DOCUMENTS

DE    102013004002 A1 *  9/2014  ............. D03D 11/00
DE    102014221080 A1     4/2016
(Continued)

OTHER PUBLICATIONS

Machine english translation of DE10201300040002A1 ; Sep. 11, 2014; Zimmermann et al. (Year: 2014).*
(Continued)

*Primary Examiner* — Anh T Mai
*Assistant Examiner* — Glenn D Zimmerman
(74) *Attorney, Agent, or Firm* — Geenblum & Bernstein, P.L.C.

(57) ABSTRACT

In order to provide a light emitting decoration, a method for laying a light emitting decoration, a laying object, and a method for forming a light emitting design, each which provides a light emitting design having excellent visibility with less light emission source and energy consumed, the light emitting decoration includes: a woven fabric having a side emission optical fiber woven in a line shape over one end side and the other end side, and the woven fabric is visually recognized in a state where the other end side is located on the front side and the one end side is located on the back side; and a light source which introduces light to advance from the one end side toward the other end side in the optical fiber. The laying object includes the light emitting decoration laid thereon.

16 Claims, 5 Drawing Sheets

(51) Int. Cl.
*B60Q 3/54* (2017.01)
*B60Q 3/64* (2017.01)
*B60Q 3/217* (2017.01)
*B29D 11/00* (2006.01)
*D03D 1/00* (2006.01)
*F21V 8/00* (2006.01)
*B60Q 3/74* (2017.01)
*B60Q 3/78* (2017.01)
*F21W 121/00* (2006.01)

(52) U.S. Cl.
CPC ............... *B60Q 3/54* (2017.02); *B60Q 3/64* (2017.02); *B60Q 3/745* (2017.02); *B60Q 3/78* (2017.02); *D03D 1/00* (2013.01); *D03D 15/00* (2013.01); *F21V 33/0016* (2013.01); *G02B 6/001* (2013.01); *D10B 2401/20* (2013.01); *D10B 2505/12* (2013.01); *F21W 2121/00* (2013.01)

(58) Field of Classification Search
CPC . B60Q 3/54; B60Q 3/217; B60Q 3/64; B60Q 3/78; B60Q 3/745; F21W 2121/00; D10B 2505/12; D10B 2401/20
See application file for complete search history.

(56) References Cited

U.S. PATENT DOCUMENTS

2017/0146715 A1* 5/2017 Bennett .............. G02B 6/03694
2017/0217366 A1 8/2017 Kraemer et al.
2017/0343736 A1* 11/2017 Yamada ................. G02B 6/001
2018/0106446 A1 4/2018 Meier et al.

FOREIGN PATENT DOCUMENTS

| EP | 2762362 A1 | 8/2014 | |
| EP | 3067449 A1 | 9/2016 | |
| FR | 2980131 A1 * | 3/2013 | ....... B29C 45/14426 |
| JP | 2010-267573 | 11/2010 | |

OTHER PUBLICATIONS

Machine english translation of FR2980131A1 Oeuvrard et al. 2013 (Year: 2013).*
Extended European Search Report issued in European Patent Office (EPO) Patent Application No. 18170774.6, dated Oct. 30, 2018.

* cited by examiner

LIGHT EMITTING DECORATION, METHOD FOR LAYING LIGHT EMITTING DECORATION, LAYING OBJECT AND METHOD FOR FORMING LIGHT EMITTING DESIGN

CROSS-REFERENCE TO RELATED APPLICATIONS

The present application claims priority of Japanese Patent Application No. 2017-103100 filed on May 24, 2017 based on § 119 of the U.S. Patent Law, and the entire disclosure of the application is clearly incorporated herein by reference.

BACKGROUND

1. Technical Field

The present invention relates to a light emitting decoration, a method for laying a light emitting decoration, a laying object, and a method for forming a light emitting design. More specifically, the invention relates to a light emitting decoration, a method for laying a light emitting decoration, a laying object, and a method for forming a light emitting design, each which can form a light emitting design using a woven fabric including an optical fiber as a constituent yarn.

2. Related Art

In recent years, lightings using a resin core and a resin clad and optical fibers suitable for decorating purposes, unlike optical fibers for communication, have been marketed. Thus, woven fabrics utilizing an optical fiber as a constituent yarn have come to be known, and, for example, lighting devices using such a woven fabric have come to be known. Specifically, a lighting device using a woven fabric including an optical fiber as a constituent yarn is known as JP 2010-267573 A which will be described below.

SUMMARY

The technique described in JP 2010-267573 A aims at eliminating light emission unevenness. JP 2010-267573 A describes that, when the light emission luminance is less than 1.7 times, humans cannot visually recognize a regularly-emitting portion and, as a result, feel this phenomenon as uneven light emission, and thus that the highest light emission luminance in a regularly woven portion is adjusted to be 1.7 times or more the lowest light emission luminance, thereby making it possible to eliminate light emission unevenness.

However, JP 2010-267573 A reviews light emission unevenness when a light emitting design is visually recognized from the front, but nowhere refers to the problem which would be caused for the first time when the light emitting design is visually recognized at an angle.

The present inventor has found that, when a woven fabric including an optical fiber as a constituent yarn is utilized to form a light emitting design, an extreme luminance difference is caused depending on an optical fiber running direction (a direction in which the optical fiber is woven), a direction of light advancing in the optical fiber, and a direction of seeing the woven fabric. The inventor has found that this great luminance difference can be utilized to provide a light emitting decoration, a method for laying a light emitting decoration, a laying object, and a method for forming a light emitting design, each which can provide a light emitting design having excellent visibility with less light emission source and energy consumed, and has completed the present invention.

An object of the present invention is to provide a light emitting decoration, a method for laying a light emitting decoration, a laying object, and a method for forming a light emitting design, each which can provide a light emitting design having excellent visibility with less light emission source and energy consumed.

A light emitting decoration of a first aspect is a light emitting decoration including: a woven fabric having a side emission optical fiber woven in a line shape over one end side and the other end side, and the woven fabric is visually recognized in a state where the other end side is located on the front side and the one end side is located on the back side; and a light source which introduces light to advance from the one end side toward the other end side in the optical fiber.

A light emitting decoration of a second aspect is the light emitting decoration of the first aspect wherein the optical fiber is a weft in the woven fabric.

A light emitting decoration of a third aspect is the light emitting decoration of the first aspect wherein the woven fabric is laid on a design surface of a door trim for a vehicle, and wherein the one end side is located on a front side of a vehicle and the other end side is located on a rear side of the vehicle.

A light emitting decoration of a fourth aspect is the light emitting decoration of the first aspect wherein the woven fabric is laid on a design surface of a ceiling for a vehicle, and wherein the one end side is located on a front side of a vehicle and the other end side is located on a rear side of the vehicle.

A laying object of a fifth aspect is a laying object including a light emitting decoration laid thereon, the light emitting decoration including: a woven fabric having a side emission optical fiber woven in a line shape over one end side and the other end side; and a light source which introduces light to advance from the one end side toward the other end side in the optical fiber, wherein the woven fabric is laid so that the woven fabric is visually recognized in a state where the other end side of the woven fabric is located on the front side and the one end side thereof is located on the back side.

A laying object of a sixth aspect is the laying object of the fifth aspect wherein the optical fiber is a weft in the woven fabric.

A laying object of a seventh aspect is the laying object of the fifth aspect wherein the woven fabric is laid on a design surface of a door trim for a vehicle, and wherein the one end side is located on a front side of a vehicle and the other end side is located on a rear side of the vehicle.

A laying object of an eighth aspect is the laying object of the fifth aspect wherein the woven fabric is laid on a design surface of a ceiling for a vehicle, and wherein the one end side is located on a front side of a vehicle and the other end side is located on a rear side of the vehicle.

A method for laying a light emitting decoration of a ninth aspect is a method for laying a light emitting decoration, the light emitting decoration including: a woven fabric having a side emission optical fiber woven in a line shape over one end side and the other end side; and a light source which introduces light to advance from the one end side toward the other end side in the optical fiber, the method including laying the woven fabric so that the woven fabric is visually recognized in a state where the other end side of the woven fabric is located on the front side and the one end side thereof is located on the back side.

A method for laying a light emitting decoration of a tenth aspect is the method for laying a light emitting decoration of the ninth aspect wherein the optical fiber is a weft in the woven fabric.

A method for laying a light emitting decoration of an eleventh aspect is the method for laying a light emitting decoration of the tenth aspect wherein the woven fabric is laid on a design surface of a door trim for a vehicle so that the one end side is located on a front side of a vehicle, and that the other end side is located on a rear side of the vehicle.

A method for laying a light emitting decoration of a twelfth aspect is the method for laying a light emitting decoration of the ninth aspect wherein the woven fabric is laid on a design surface of a ceiling for a vehicle so that the one end side is located on a front side of a vehicle, and that the other end side is located on a rear side of the vehicle.

A method for forming a light emitting design of a thirteenth aspect is a method for forming a light emitting design for forming a light emitting design using a woven fabric having a side emission optical fiber woven in a line shape over one end side and the other end side, the method including introducing light in the optical fiber so that the light advances from the one end side toward the other end side when the light emitting design is visually recognized in a state where the other end side of the woven fabric is located on the front side and the one end side thereof is located on the back side.

A method for forming a light emitting design of a fourteenth aspect is the method for forming a light emitting design of the thirteenth aspect wherein the optical fiber is a weft in the woven fabric.

A method for forming a light emitting design of a fifteenth aspect is the method for forming a light emitting design of the thirteenth aspect wherein the woven fabric is laid on a design surface of a door trim for a vehicle, and wherein the one end side is located on a front side of a vehicle and the other end side is located on a rear side of the vehicle.

A method for forming a light emitting design of a sixteenth aspect is the method for forming a light emitting design of the thirteenth aspect wherein the woven fabric is laid on a design surface of a ceiling for a vehicle, and wherein the one end side is located on a front side of a vehicle and the other end side is located on a rear side of the vehicle.

According to the light emitting decoration of the present embodiment, a light emitting design having excellent visibility can be obtained with less light emission and energy consumed. When the woven fabric including an optical fiber woven in a line shape is visually recognized in a state where the other end side of the woven fabric is located on the front side and the one end side thereof is located on the back side, light advancing from one end side of the optical fiber to the other end side thereof is introduced, thereby making it possible to provide a light emitting design having remarkably excellent visibility as compared with that obtained when light advancing from the other end side of the optical fiber to the one end side thereof is introduced.

When the optical fiber is a weft in the woven fabric, there is a tendency that a small crimp is generated as compared with when the optical fiber is a warp, so that the directivity of light due to side light leakage becomes clearer. Therefore, the above-described effect due to the features of this light emitting decoration can be obtained more greatly.

When the woven fabric is laid on a design surface of a door trim for a vehicle, the one end side is located on a front side of a vehicle, and the other end side is located on a rear side of the vehicle, the above-described effect due to the features of this light emitting decoration can be obtained accurately.

When the woven fabric is laid on a design surface of a ceiling for a vehicle, the one end side is located on a front side of a vehicle, and the other end side of the woven fabric is a rear side of the vehicle, the above-described effect due to the features of this light emitting decoration can be obtained accurately.

According to the laying object of the present embodiment, a light emitting design having excellent visibility can be obtained with less light emission source and energy consumed. When the woven fabric including an optical fiber woven in a line shape is visually recognized in a state where the other end side of the woven fabric is located on the front side and the one end side thereof is located on the back side, light advancing from one end side of the optical fiber to the other end side thereof is introduced, thereby making it possible to provide a light emitting design having remarkably excellent visibility as compared with that obtained when light advancing from the other end side of the optical fiber to the one end side thereof is introduced.

When the optical fiber is a weft in the woven fabric, there is a tendency that a small crimp is generated as compared with when the optical fiber is a warp, so that the directivity of light due to side light leakage becomes clearer. Therefore, the above-described effect due to the features of this laying object can be obtained more greatly.

When the woven fabric is laid on a design surface of a door trim for a vehicle, the one end side is located on a front side of a vehicle, and the other end side is located on a rear side of the vehicle, the above-described effect due to the features of this laying object can be obtained more greatly.

When the woven fabric is laid on a design surface of a ceiling for a vehicle, the one end side of the woven fabric is located on a front side of a vehicle, and the other end side is a rear side of the vehicle, the above-described effect due to the features of the laying object can be obtained accurately.

According to the method for laying a light emitting decoration according to the present embodiment, a light emitting design having excellent visibility can be obtained with less light emission source and energy consumed. When the woven fabric including an optical fiber woven in a line shape is visually recognized in a state where the other end side of the woven fabric is located on the front side and the one end side thereof is located on the back side, light advancing from one end side of the optical fiber to the other end side thereof is introduced, thereby making it possible to provide a light emitting design having remarkably excellent visibility as compared with that obtained when light advancing from the other end side of the optical fiber to the one end side thereof is introduced.

When the optical fiber is a weft in the woven fabric, there is a tendency that a small crimp is generated as compared with when the optical fiber is a warp, so that the directivity of light due to side light leakage becomes clearer. Therefore, the above-described effect due to the use of this method for laying a light emitting decoration can be obtained more greatly.

When the woven fabric is laid on a design surface of a door trim for a vehicle, the one end side is located on a front side of a vehicle, and the other end side is located on a rear side of the vehicle, the above-described effect due to the use of this method for laying a light emitting decoration can be obtained accurately.

When the woven fabric is laid on a design surface of a ceiling for a vehicle, the one end side of the woven fabric is located on a front side of a vehicle, and the other end side is a rear side of the vehicle, the above-described effect due to the use of this method for laying a light emitting decoration can be obtained accurately.

According to the method for forming a light emitting design according to the present embodiment, a light emitting design having excellent visibility can be obtained with less light emission source and energy consumed. When the woven fabric including an optical fiber woven in a line shape is visually recognized in a state where the other end side of the woven fabric is located on the front side and the one end side thereof is located on the back side, light advancing from one end side of the optical fiber to the other end side thereof is introduced, thereby making it possible to provide a light emitting design having remarkably excellent visibility as compared with that obtained when light advancing from the other end side of the optical fiber to the one end side thereof is introduced.

When the optical fiber is a weft in the woven fabric, there is a tendency that a small crimp is generated as compared with when the optical fiber is a warp, so that the directivity of light due to side light leakage becomes clearer. Therefore, the above-described effect due to the use of this method for forming a light emission design can be obtained more greatly.

When the woven fabric is laid on a design surface of a door trim for a vehicle, the one end side is located on a front side of a vehicle, and the other end side is located on a rear side of the vehicle, the above-described effect due to the use of this method for forming a light emission design can be obtained accurately.

When the woven fabric is laid on a design surface of a ceiling for a vehicle, the one end side of the woven fabric is located on a front side of a vehicle, and the other end side is a rear side of the vehicle, the above-described effect due to the use of this method for forming a light emission design can be obtained accurately.

BRIEF DESCRIPTION OF DRAWINGS

The present invention is further described in the detailed description which follows, in reference to the noted plurality of drawings by way of non-limiting examples of exemplary aspects of the present invention, in which like reference numerals represent similar parts throughout the several views of the drawings.

DETAILED DESCRIPTION

Figure 1:
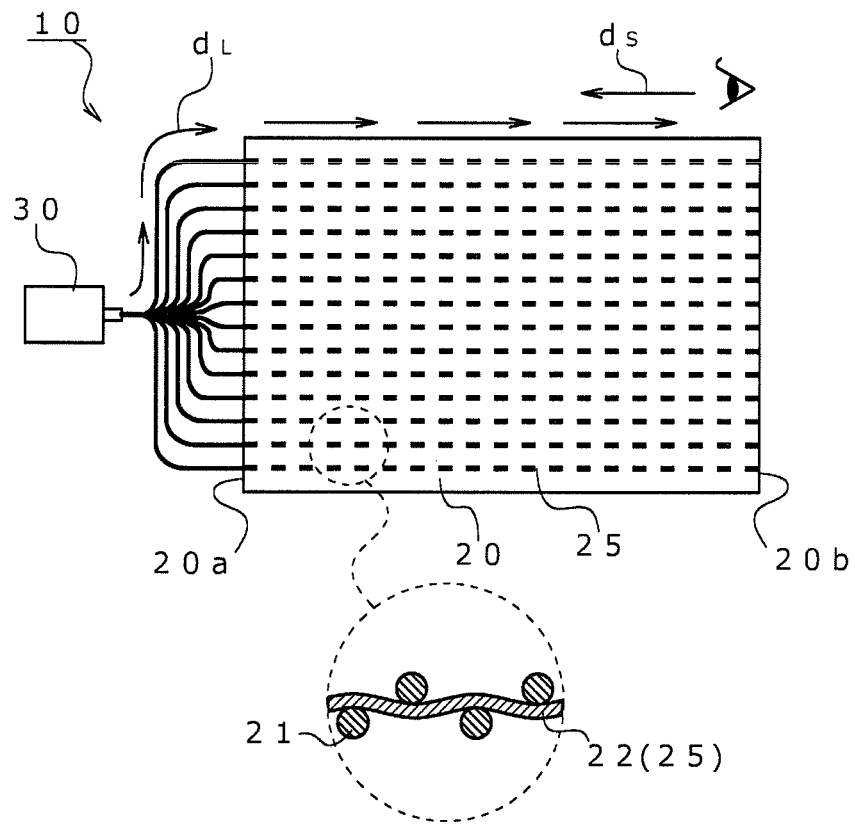
FIG. 1 is an explanatory view for explaining an outline of a light emitting decoration of the present invention.

The particulars shown herein are by way of example and for purposes of illustrative discussion of the aspects of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings, making apparent to those skilled in the art how some forms of the present invention may be embodied in practice.

[1] Light Emitting Decoration

A light emitting decoration (10) of the present invention includes a woven fabric (20) and a light source (30).

The woven fabric (20) has a side emission optical fiber (25) woven in a line shape over one end (20a) side of the woven fabric (20) and the other end (20b) side thereof. Further, the woven fabric (20) is visually recognized in a state where the other end (20b) side thereof is located on the front side and the one end (20a) side thereof is located on the back side.

The light source (30) introduces light to advance from the one end (20a) side toward the other end (20b) side in the optical fiber (25) (see FIG. 1).

In FIG. 1, $d_L$ represents a light advancing direction and $d_S$ represents a visual line direction.

The "woven fabric (20)" described above is a fabric woven using warps and wefts. Also, the woven fabric 20 has side emission optical fibers 25 woven in a line shape over one end 20a side of the woven fabric 20 and the other end 20b side thereof. That is, the optical fibers (optical fiber yarns) 25 are utilized as part of the warps 21 and wefts 22 in the woven fabric 20 (see FIG. 1).

The enlarged view in the lower part of FIG. 1 illustrates plain weave of the warps 21 and the wefts 22 for convenience, but the weave structure is not limited to this.

The optical fibers 25 may constitute all of the warps 21 and all of the wefts 22, but, in the present invention, are preferably incorporated as part of the warps 21 or incorporated as part of the weft 22.

Especially, in this light emitting decoration, the optical fibers 25 are preferably wefts in the woven fabric 20. The wefts generate small crimps as compared with the warps, thereby increasing the linearity of the optical fibers 25. Thus, a luminance difference between when light leakage from the optical fibers is visually recognized opposite to the light advancing direction and when light leakage from the optical fibers is visually recognized along the light advancing direction is observed to be great as compared with when the optical fibers 25 are utilized as the warps. Accordingly, the action due to this light emitting decoration can be more effectively obtained in the woven fabric utilizing the optical fibers 25 as the wefts.

When the optical fibers 25 are used as part of the warps 21 or as part of the wefts 22, the proportion of the optical fibers 25 in the number of the warps or the proportion of the optical fibers 25 in the number of the wefts can be defined as 3% or more and 90% or less, further as 5% or more and 80% or less, further as 8% or more and 70% or less, further as 10% or more and 60% or less, further 12% or more and 50% or less, and further as 15% or more and 40% or less.

The warps and wefts are also referred to collectively as constituent yarns in the present specification. The constituent yarns except the optical fibers 25 are referred to also as "other constituent yarns."

The "optical fiber (25)" described above is a side emission optical fiber. Specifically, when light is introduced from an end of the optical fiber 25, this optical fiber yarn can leak the introduced light from the side surface of the optical fiber (emit light from the side surface) while guiding light in the yarn.

While the optical fiber 25 usually has a core/sheath structure (having a clad and a core), the mechanism of side emission is not limited. Specifically, for example, the following optical fibers (1) to (3) are exemplified: (1) a clad-deficient type optical fiber having a site where a clad part is locally absent (clad deficient site) so that light is leaked from such a site; (2) a light scattering type optical fiber which includes a core part containing a light scattering substance and in which the light guided in the core hits the light scattering substance, and thus scatters and is leaked; and (3) a refractive index control type optical fiber in which the reflectivity at an interface between the core part and the clad part is reduced due to a great difference in refractive index between the core part and the clad part so that light is leaked. These optical fibers may be used singly, or two or more thereof may be used in combination.

In this light emitting decoration, the (3) refractive index control type optical fiber is preferred among the above-described optical fibers. This is because, in this refractive index control type optical fiber, a luminance difference between when light leakage from the optical fiber is visually recognized opposite to the light advancing direction and when light leakage from the optical fibers is visually recognized along the light advancing direction is observed to be especially great as compared with the luminance differences in the other fibers.

The refractive index difference in the (3) optical fiber is not particularly limited, but is preferably "$0.01 \leq \{(n_1-n_2)/n_1\}$" when the refractive index of the core is "$n_1$" and the refractive index of the clad is "$n_2$."

Specifically, the optical fiber 25 has a resin core part and a resin clad part surrounding the outer periphery of the core part, and is preferably an optical fiber which causes side light leakage due to the matter that $(n_1-n_2)/n_1$ is 0.01 or more when the refractive index of the core part is $n_1$ and the refractive index of the clad part is $n_2$. Thus, when the optical fiber causes side light leakage due to the matter that $0.01 \leq \{(n_1-n_2)/n_1\}$, there is a tendency that the directivity of light due to side light leakage becomes clearer. Therefore, the above-described effect due to the features of this light emitting decoration can be obtained more greatly.

The upper limit of this $\{(n_1-n_2)/n_1\}$ is not limited, and, for example, can be "$\{(n_1-n_2)/n_1\} \leq 0.2$." Further, $\{(n_1-n_2)/n_1\}$ can be defined further as $0.02 \leq \{(n_1-n_2)/n_1\} \leq 0.15$, further as $0.03 \leq \{(n_1-n_2)/n_1\} \leq 0.12$, and further as $0.04 \leq \{(n_1-n_2)/n_1\} \leq 0.10$. The refractive index conforms to JIS K7142.

From the viewpoint of attaining the property of being able to be woven to form the woven fabric 20, the optical fiber 25 utilized in this light emitting decoration preferably has a core part and a clad part both which are made of a resin. However, the optical fiber 25 may contain an inorganic granular material as the light scattering material, as described above.

The kind of resin which constitutes the core part is not limited, and, for example, an acrylic resin, a polystyrene-based resin, a polycarbonate-based resin and a fluorine-containing resin can be used. These resins may be used singly, or two or more thereof may be used in combination.

Among these resins, the acrylic resin includes polymethyl methacrylate. The polystyrene-based resin includes polystyrene. The polycarbonate-based resin includes polycarbonate. Examples of the fluorine-containing resin include fluorinated acrylic resins (such as fluorinated polymethyl methacrylate), fluorinated polystyrene-based resins, fluorinated polycarbonate-based resins, fluorinated polyolefin-based resins (such as fluorinated polyethylene) and other fluorine-containing resins (such as polyvinyl fluoride, polyvinylidene fluoride and fluorinated alkyl vinyl ether polymers).

Further, the kind of resin which constitutes the clad part is not limited, and a fluorine-containing resin can be used. The fluorine-containing resin is as described above.

The resin which constitutes the core part and the resin which constitutes the clad part are different in refractive index. The fluorine-containing resin is a resin having a proportion of C—H bonds reduced by fluorine-atom substitution of the hydrogen atoms which constitute the C—H bonds in the resin, and the refractive index can be adjusted by adjusting the degree of substitution.

The thickness of the optical fiber 25 is not limited, and can be defined as 0.01 mm or more and 2.0 mm or less, further as 0.05 mm or more and 1.5 mm or less, further as 0.10 mm or more and 1.0 mm or less, and further as 0.15 mm or more and 0.7 mm or less from the viewpoint of obtaining the weaving property.

The woven fabric 20 can include other constituent yarns other than the optical fiber 25. The materials which constitute the other constituent yarns are not limited. Specifically, the materials may be natural fibers, synthetic fibers or composite fibers thereof. In the case of synthetic fibers, examples of the constituent resins include polyamide-based resins such as nylon 6 and nylon 66; polyester-based resins such as polyethylene terephthalate, polybutylene terephthalate and polytrimethylene terephthalate; polyolefin-based resins such as polypropylene; and polyacrylic resins. These resins may be used singly, or two or more thereof may be used in combination.

The functions of the other constituent yarns are also not limited, and examples thereof include protective yarns which protect the optical fiber 25, thermally fusing yarns which fuse yarns to each other, light amount adjusting yarns which adjust the light amount, and other constituent yarns not included in any of the above-described yarns. These yarns may be used singly, or two or more thereof may be used in combination.

The protective yarn is a yarn configured to have a fineness larger than that of the optical fiber 25 and thus having an apparent thickness larger than that of the optical fiber 25. The protective yarn is thicker than the optical fiber 25, and thus can protect the optical fiber 25 from damage and wear. The ratio ($D_E/D_F$) of the fineness ($D_E$) of the protective yarn to the fineness ($D_F$) of the optical fiber 25 can be defined as 1.5 or more and 7.0 or less, further as 2.0 or more and 6.5 or less, further as 2.8 or more and 6.3 or less, and further as 3.4 or more and 6.1 or less. Further, the fineness ($D_E$) of the protective yarn can be defined as 1000 dtex or more and 4500 dtex or less, further as 1500 dtex or more and 3900 dtex or less, further as 1800 dtex or more and 3800 dtex or less, and further as 2100 dtex or more and 3700 dtex or less. The form of the protective yarn may be a monofilament, but is preferably a multifilament since the multifilament can make the woven fabric 20 more flexible.

The thermally fusing yarn is a yarn which prevents the optical fiber 25 (in general, which easily falls off since the optical fiber is a monofilament) from falling off from the woven fabric 20. The configuration of the thermally fusing yarn is not limited, and there can be utilized, for example, yarns which exhibit a core/sheath structure (which have a core/sheath structure before fusion by heating and, after melted by heating, becomes normal yarns) having a sheath portion made of a thermally fusible resin and a core portion remaining after heat fusion.

The light amount adjusting yarn is a yarn which absorbs, shields and reflects light from the optical fiber 25, thereby making it possible to adjust the amount and quality of light.

Further, examples of the other constituent yarns not included in any of the above-described yarns include a yarn which constitutes a non-light emitting part (woven fabric 20 portion not involved in light emission) of the woven fabric 20 and a back fixing yarn.

The above-described other constituent yarns can contain a light transmission inhibiting component. The other constituent yarns contain a light transmission inhibiting component (for example, light transmission inhibition by reflection or light absorption) and thus can improve the light shielding property to the optical fiber 25. Specifically, the light transmission inhibiting component may be either contained in the fiber materials which constitute the other constituent yarns or attached to surfaces of the other constituent yarns by coating or any other method. Examples of the light transmission inhibiting component include coloring agents (such as pigments and dyes), light absorbers and thickeners (such as various fillers).

The "light source (30)" described above is a means for introducing light so that the light advances from one end 20a side of the woven fabric 20 to the other end 20b side thereof in the optical fiber 25 when the above-described woven fabric 20 is visually recognized in a state where the other end 20b side is located on the front side and the one end 20a side is located on the back side. This light source 30 normally has a light emission source such as an LED or an electric bulb. Among these light emission sources, an LED is preferred from the viewpoint of easiness to transmit. The wavelength of the light to be emitted from the light source 30 is not limited, but is preferably visible light (normally, 360 nm or more and 830 nm or less, further 380 nm or more and 750 nm or less) from the viewpoint of obtaining a light emitting design.

The phrase "visually recognized in a state where the other end 20b side is located on the front side and the one end 20a side is located on the back side" means a state where the woven fabric 20 is visually recognized eccentrically on an end side. Further, in other words, this phrase means a state where a light emitting design generated from the woven fabric 20 is viewed while the other end 20b side is located on the front side and the one end 20a side is located on the back side (visual line direction from the other end 20b side toward the one end 20a side).

Figure 2:
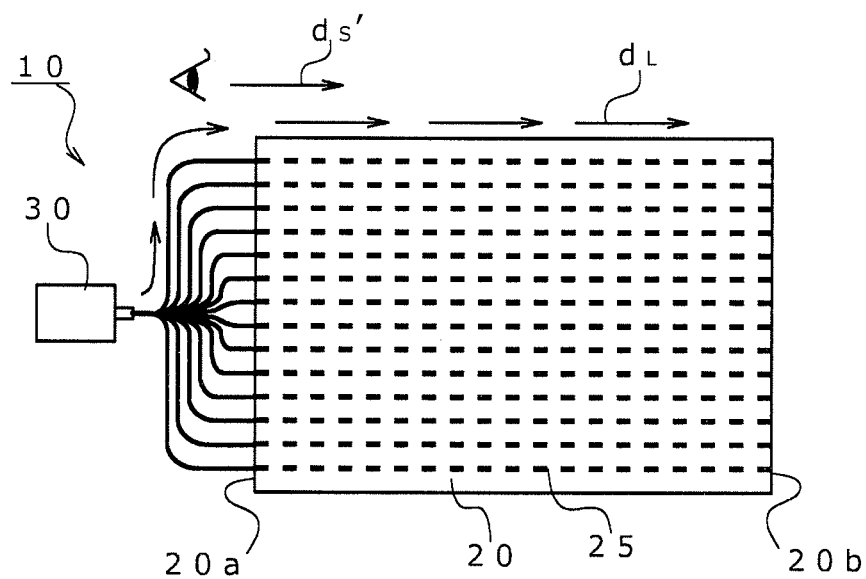
FIG. 2 is an explanatory view for explaining a light emitting decoration of a comparative form.

When the visual line direction $d_S{}'$ is directed from the other end 20b side to the one end 20a side as shown in FIG. 2, there is observed the phenomenon that the luminance of the light emitting design which can be visually recognized by an observer becomes small (1) when light is introduced into the optical fiber so that the light advances in the same direction as the visual line direction.

Contrary to this, (2) when light is introduced into the optical fiber so that the light advances in a direction opposite (reverse) to the visual line direction $d_S$ as shown in FIG. 1, the luminance of the light emitting design which can be visually recognized by an observer can be increased. Thus, since this light emitting decoration has the light source 30 which can introduce into the optical fiber 25 the light opposite to the visual line direction $d_S$, a light emitting design having excellent visibility can be obtained with less light emission source and energy consumed. Namely, it is possible to obtain a light emitting design maximally utilizing the light amount, to reduce the number of light emission sources to be utilized such as an LED, and also to reduce the amount of energy required to make the light emission sources such as an LED emit light.

The specific features of this light emitting decoration 10 are not limited, and the following features (1) to (3) are exemplified.

Figure 3:
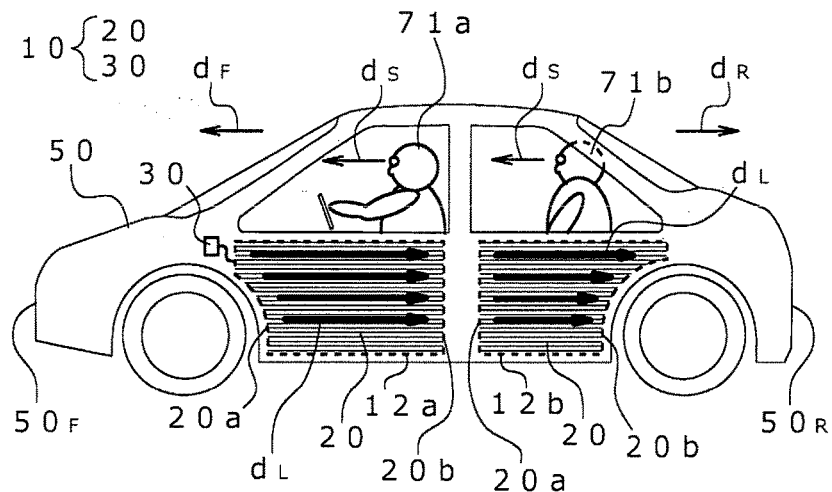
FIG. 3 is an explanatory view for explaining a state when the light emitting decoration of the present invention is utilized in a door trim.
Figure 4:
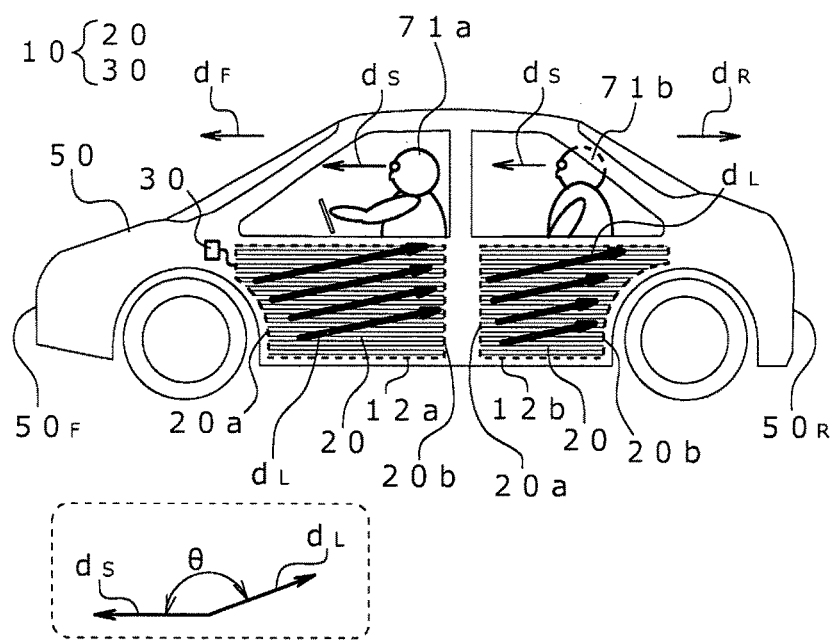
FIG. 4 is an explanatory view for explaining a state when the light emitting decoration of the present invention is utilized in the door trim.
Figure 5:
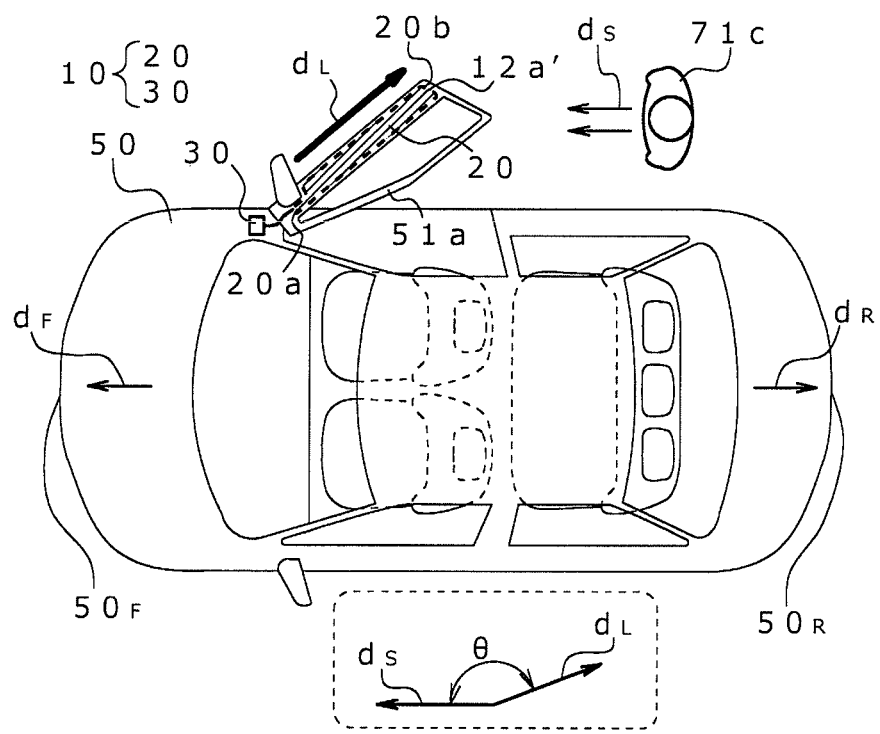
FIG. 5 is an explanatory view for explaining a state when the light emitting decoration of the present invention is utilized in the door trim.

(1) A light emitting decoration 10 wherein the woven fabric 20 is laid on the design surface of the door trim 12 for a vehicle, the one end 20a side of the woven fabric 20 is located on a front $50_F$ side of a vehicle, and the other end 20b side of the woven fabric 20 is located a rear $50_R$ side of the vehicle (see FIG. 3 to FIG. 5).

The door trim 12 (front door trim 12a and rear door trim 12b) is a laying object 11 that includes a trim substrate (not shown) having a design surface onto which the woven fabric 20 is applied and attached and also that includes a light source 30 which can guide light to this woven fabric 20.

In this light emitting decoration 10, the woven fabric 20 is visually recognized eccentrically to a normal visual line direction $d_S$ of an occupant 71 (driver 71a or rear-seat occupant 71b) or a person 71c who is about to ride on the vehicle. Specifically, assuming that the vehicle 50 is an automobile and that the viewer is the driver 71a, the normal visual line direction $d_S$ of the driver 71a is a vehicle advancing direction $d_F$. Thus, the driver 71a visually recognizes the woven fabric 20 laid on the design surface of the front door trim 12a from the other end 20b side of the woven fabric 20 toward the one end 20a side thereof. In this case, since this light emitting decoration has the light source 30 which can introduce light so as to guide light from the front $50_F$ side of the vehicle toward the rear $50_R$ side of the vehicle in the optical fiber (i.e., toward the rear side $d_R$ of the vehicle), it is possible to provide a light emitting design having excellent visibility to the driver 71a with less light emission source and energy consumed (see FIG. 3 and FIG. 4).

Similarly, assuming that the viewer is the rear-seat occupant 71b, the normal visual line direction $d_S$ of the rear-seat occupant 71b is the vehicle advancing direction $d_F$. Thus, the rear-seat occupant 71b visually recognizes the woven fabric 20 laid on the design surface of the rear door trim 12b from the other end 20b side of the woven fabric 20 toward the one end 20a side thereof. Also in this case, since this light emitting decoration has the light source 30 which can introduce light so as to guide light from the front $50_F$ side of the vehicle toward the rear $50_R$ side of the vehicle in the optical fiber (i.e., toward the rear side $d_R$ of the vehicle), it is possible to provide a light emitting design having excellent visibility to the rear-seat occupant 71b with less light emission source and energy consumed (see FIG. 3 and FIG. 4).

In FIG. 4, the angle θ between the visual line direction $d_S$ and the light advancing direction $d_L$ is not limited, but is preferably 90°<θ≤180°, more preferably 80°≤θ≤180°, further preferably 70°≤θ≤180°.

Further, assuming that the viewer is the person 71c who is about to ride on the vehicle as shown in FIG. 5, the normal visual line direction $d_S$ of the person 71c is the advancing direction $d_F$ of the vehicle 50. Thus, the person 71c visually recognizes the woven fabric 20 laid on the design surface of the front door trim 12a from the other end 20b side of the woven fabric 20 toward the one end 20a side thereof. In this case, since this light emitting decoration has the light source 30 which can introduce light so as to guide light from the front $50_F$ side of the vehicle toward the rear $50_R$ side of the vehicle in the optical fiber (i.e., toward the rear side $d_R$ of the vehicle), it is possible to provide a light emitting design having excellent visibility also from the outside of the vehicle to the person 71c positioned behind a front door 51a when the front door 51a is opened.

In FIG. 5, the angle θ between the visual line direction $d_S$ and the light advancing direction $d_L$ is not limited, but is preferably 90°<θ≤180°, more preferably 80°≤θ≤180°, further preferably 70°≤θ≤180°.

If a light emitting design having a luminance equivalent to the above-described luminance is intended to be obtained while light is guided in the same direction as the normal visual line direction $d_S$ of the driver 71a in contrast to the above-described case (FIG. 3 to FIG. 5), it would become necessary to increase the number of light emission sources or to increase the amount of energy required for light emission (to increase the amount of entering light), and a surplus number of light emission sources and surplus spaces and heat exhausting structures therefor would be required. Further, the energy consumed would be increased. In such a case, there would be concerns about the reflection of the light emitting design on the front glass of the vehicle 50. In this regard, this light emitting decoration 10 can prevent the occurrence of the above-described problems.

From the viewpoint that the length of the light guide path which connects the light source 30 and the woven fabric 20 can be shortened, the light source 30 is arranged on the one end 20a side of the woven fabric 20 in FIG. 3 to FIG. 5, but the arrangement of the light source 30 itself is not limited to this. The light source 30 has only to guide light in a direction opposite to the visual line direction $d_S$ in the optical fiber, and may be arranged either on the other end 20b side or in any other position in the woven fabric 20.

Figure 6:
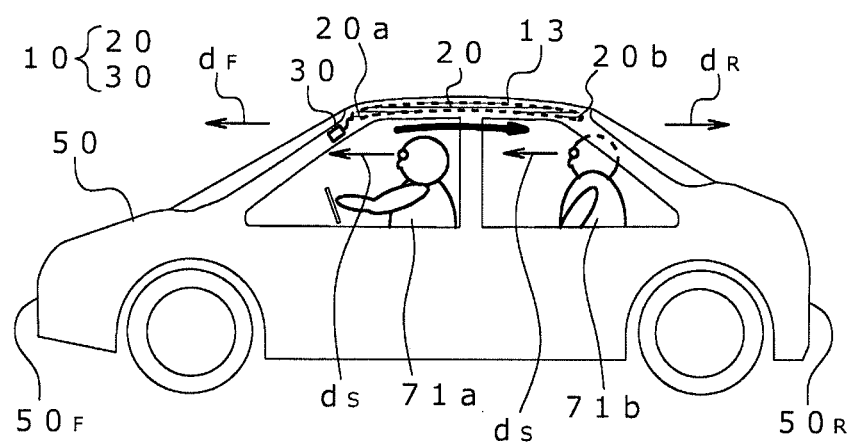
FIG. 6 is an explanatory view for explaining a state when the light emitting decoration of the present invention is utilized in a ceiling for a vehicle.
Figure 7:
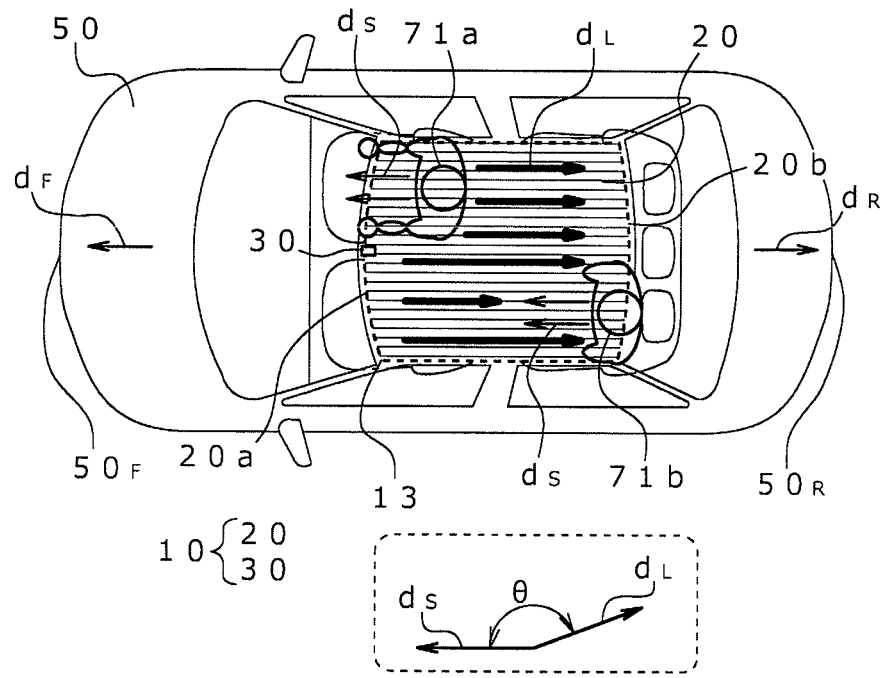
FIG. 7 is an explanatory view for explaining a state when the light emitting decoration of the present invention is utilized in the ceiling for a vehicle.

(2) A light emitting decoration 10 wherein the woven fabric 20 is laid on the design surface of the ceiling 13 for a vehicle, and wherein the one end 20a side of the woven fabric 20 is located on the front $50_F$ side of the vehicle and the other end 20b side of the woven fabric 20 is located on the rear $59_R$ side of the vehicle (see FIG. 6 to FIG. 7).

The ceiling 13 for a vehicle is a laying object 11 that includes a ceiling substrate (not shown) having a design surface onto which the woven fabric 20 is applied and attached and that includes a light source 30 which can guide light to this woven fabric 20.

In this light emitting decoration 10, the woven fabric 20 is visually recognized eccentrically to the normal visual line direction $d_S$ of the occupant 71 (driver 71a or rear-seat occupant 71b). Specifically, assuming that the vehicle 50 is an automobile and that the viewer is the driver 71a, the normal visual line direction $d_S$ of the driver 71a is the vehicle advancing direction $d_F$. Thus, the driver 71a visually recognizes the woven fabric 20 laid on the design surface of the ceiling 13 for a vehicle from the other end 20b side of the woven fabric 20 toward the one end 20a side thereof. In this case, since this light emitting decoration has the light source 30 which can introduce light so as to guide light from the front $50_F$ side of the vehicle toward the rear $50_R$ side of the vehicle in the optical fiber (i.e., toward the rear side $d_R$ of the vehicle), it is possible to provide a light emitting design having excellent visibility to the driver 71a with less light emission source and energy consumed (see FIG. 6 and FIG. 7).

Similarly, assuming that the viewer is the rear-seat occupant 71b, the normal visual line direction $d_S$ of the rear-seat occupant 71b is the vehicle advancing direction $d_F$. Thus, the rear occupant 71b also visually recognizes the woven fabric 20 laid on the design surface of the ceiling 13 for a vehicle from the other end 20b side of the woven fabric 20 toward the one end 20a side thereof. Also in this case, since this light emitting decoration has the light source 30 which can introduce light so as to guide light from the front $50_F$ side of the vehicle toward the rear $50_R$ side of the vehicle in the optical fiber (i.e., toward the rear side $d_R$ of the vehicle), it is possible to provide a light emitting design having excellent visibility to the rear-seat occupant 71b with less light emission source and energy consumed (see FIG. 6 and FIG. 7).

In FIG. 7, the angle θ between the visual line direction $d_S$ and the light advancing direction $d_L$ is not limited, but is preferably 90°<θ≤180°, more preferably 80°≤θ≤180°, further preferably 70°≤θ≤180°.

(3) A light emitting decoration 10 wherein the woven fabric 20 is laid as a curtain 60, and wherein the one end 20a side of the woven fabric 20 is located on an upper end 60a side of the curtain 60 and the other end 20b side of the woven fabric 20 is located on a lower end 60b side of the curtain 60. Also in this light emitting decoration 10, the curtain 60 (woven fabric 20) is visually recognized eccentrically to the visual line direction $d_s$ ($d_{S1}$ to $d_{S3}$) of the observer 72.

Figure 8:
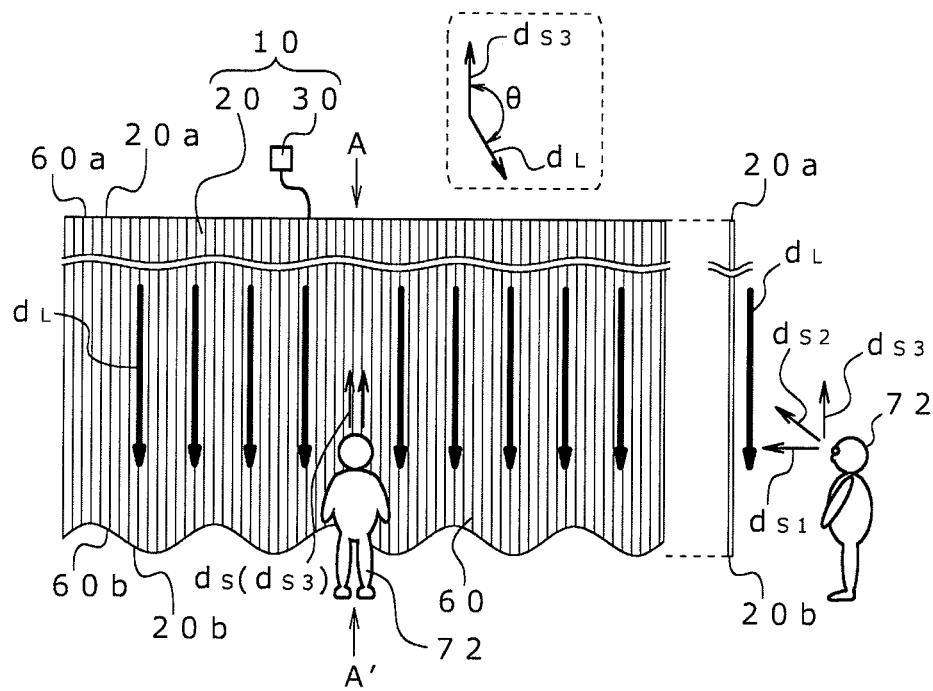
FIG. 8 is an explanatory view for explaining a state when a woven fabric of the light emitting decoration of the present invention is utilized as a curtain.

Specifically, when the upper end 60a of the curtain 60 is positioned above the height of the eyes of the observer 72 and the light emitting design is presented from that position as shown in FIG. 8, the visual line direction $d_s$ of the observer 72 to the curtain 60 is directed upward as compared with the normal visual line direction $d_{s1}$. Briefly, in FIG. 8, the visual line direction $d_s$ is a visual line direction $d_{s2}$ or $d_{s3}$ (upward visual line $d_{s3}$) (in FIG. 8, the right side view is a lateral view in the A-A' cross section of the left side view), and is directed from the lower end 60b side of the curtain 60 toward the upper end 60a side thereof.

Thus, in this case, since this light emitting decoration has the light source 30 which can introduce light so as to guide light from the upper end 60a side of the curtain 60 toward the lower end 60b side thereof in the optical fiber, it is possible to provide a light emitting design having excellent visibility to the observer 72 with less light emission source and energy consumed.

In FIG. 8, the angle θ between the visual line direction $d_{s3}$ and the light advancing direction $d_L$ (advancing angle of light on a surface of the curtain 60) is not limited, but is preferably −90°<θ<90°, more preferably −80°≤θ≤80°, further preferably −70°≤θ≤70°.

The above state applies, for example, to a similar wall paper (woven fabric 20 which decorates a wall fabric or wall surface). However, this light emitting decoration 10 normally does not encompass the case where the person is a viewer in a state of directly wearing the woven fabric 20 (for example, clothing).

[2] Laying Object

The laying object (11) of the present invention is a laying object including a light emitting decoration (10) laid thereon, the light emitting decoration (10) including: a woven fabric (20) having a side emission optical fiber (25)

woven in a line shape over one end (20a) side and the other end (20b) side; and a light source (30) which introduces light to advance from the one end (20a) side toward the other end (20b) side in the optical fiber (25), characterized in that the woven fabric (20) is laid so that the woven fabric (20) is visually recognized in a state where the other end (20b) side of the woven fabric is located on the front side and the one end (20a) side thereof is located on the back side.

Thus, a light emitting design having excellent visibility can be obtained with less light emission source and energy consumed. The woven fabric 20, light source 30 and the like in this laying object 11 are similar to those in the light emitting decoration 10 described above.

This laying object 11 can include, for example, a substrate for supporting the woven fabric 20 in this light emitting decoration 10, in addition to the light emitting decoration 10.

In this laying object 11, the above-described optical fibers 25 may be used as either warps or wefts in the woven fabric 20, but are preferably wefts similarly as in the above-described light emitting decoration.

Further, in this laying object 11, the woven fabric 20 is laid on the design surface of the door trim for a vehicle, the one end 20a side is located on a front side of a vehicle and the other end 20b side is located on a rear side of the vehicle, similarly as in the above-described light emitting decoration.

Further, in this laying object 11, the woven fabric 20 is laid on the design surface of the ceiling for a vehicle, the one end 20a side is located on a front side of a vehicle and the other end 20b side is located on a rear side of the vehicle, similarly as in the above-described light emitting decoration.

[3] Method for Laying Light Emitting Decoration

The method for laying a light emitting decoration according to the present invention is a method for laying a light emitting decoration (10), the light emitting decoration (10) including: a woven fabric (20) having a side emission optical fiber (25) woven in a line shape over one end (20a) side and the other end (20b) side; and a light source (30) which introduces light to advance from the one end (20a) side toward the other end (20b) side in the optical fiber (25), characterized in that the method includes laying the woven fabric (20) so that the woven fabric (20) is visually recognized in a state where the other end (20b) side of the woven fabric (20) is located on the front side and the one end (20a) side thereof is located on the back side.

The woven fabric 20, light source 30 and the like in this laying method are similar to those in the light emitting decoration 10 described above.

In this laying method, for example, when there is a curtain as described above, the curtain (woven fabric 20) is laid so that the curtain is visually recognized in a state where the other end 20b side is located on the front side and the one end 20a side is located on the back side in consideration of the orientation direction of the optical fiber 25 arranged in the curtain and the light guiding direction by the light source, thereby making it possible to provide a light emitting design having excellent visibility with less light emission source and energy consumed.

This laying method can involve the use of, for example, a substrate for supporting the woven fabric 20 in this light emitting decoration 10, in addition to the light emitting decoration 10.

In this laying method, the above-described optical fibers 25 may be used as either warps or wefts in the woven fabric 20, but are preferably wefts similarly as in the above-described light emitting decoration.

Further, this laying method can be used to suitably lay the woven fabric 20 as the design surface of the door trim for a vehicle or the design surface of the ceiling for a vehicle, as with the light emitting decoration described above.

[4] Method for Forming Light Emitting Design

The method for forming a light emitting design according to the present invention is a method for forming a light emitting design for forming a light emitting design using a woven fabric (20) having a side emission optical fiber (25) woven in a line shape over one end (20a) side and the other end (20b) side, characterized in that the method includes introducing light in the optical fiber (25) so that the light advances from the one end (20a) side toward the other end (20b) side when the light emitting design is visually recognized in a state where the other end (20b) side of the woven fabric (20) is located on the front side and the one end (20a) side of the woven fabric (20) is located on the back side.

The woven fabric 20 in this forming method is similar to that in the light emitting decoration 10 described above. The light source 30 can be utilized to introduce light into the optical fiber 25 so that the light advances from the one end 20a side to the other end 20b side with respect to this woven fabric 20, as described above.

In this forming method, for example, light is guided so that the light advances from the one end 20a side of the woven fabric 20 toward the other end 20b side thereof in consideration of the orientation direction of the optical fiber 25 arranged in the woven fabric 20 and the light guiding direction by the light source, thereby making it possible to provide a light emitting design having excellent visibility with less light emission source and energy consumed.

In this forming method, the above-described optical fibers 25 may be used as either warps or wefts in the woven fabric 20, but are preferably wefts similarly as in the above-described light emitting decoration.

Further, the woven fabric 20 is utilized as the design surface of the door trim for a vehicle or the design surface of the ceiling for a vehicle according to this forming method, thereby making it possible to provide a light emitting design having excellent visibility, as with the light emitting decoration described above.

The shapes, sizes, thicknesses and the like of the light emitting decoration and laying object according to the present invention are not particularly limited, nor are the intended uses thereof particularly limited. They are widely utilized in various fields of vehicles (such as automobiles and railroad vehicles), airplanes, ships, architecture and the like. Similarly, the intended uses of the method for laying a light emitting decoration and method for forming a light emitting design according to the present invention are not particularly limited, and they are widely utilized in various fields of vehicles (such as automobiles and railroad vehicles), airplanes, ships, architecture and the like.

Specifically, examples of interior materials include interior parts for a vehicle, for example, vehicle interior parts which exhibit a plate shape such as package boards (a luggage board and a deck board); trim parts such as a door trim, an arm rest, an upper trim, a decoration panel, an ornament panel, a lower trim, a pocket (a door trim pocket) and a quarter trim; a pillar garnish; a cowl side garnish (a cowl side trim); seat parts such as a side air bag peripheral part; instrumental panel parts such as a center cluster, a register, a center box (door), a grab door and an air bag peripheral part; a center console; an overhead console; a sun visor; a CRS cover; an under tray; a package tray; a seat side garnish; and a ceiling decoration.

As interior materials for architecture, they can be utilized, for example, in wall members, door members, various types of furniture (a desk, a chair, a shelf, a chest and the like), containers (such as a tray), protecting members and partition members.

Especially, the woven fabric in the light emitting decoration and laying object is utilized as design surfaces of these.

EXAMPLE

Hereinafter, the present invention is described concretely by way of Example.

The following woven fabric 20 and the following light source 30 were used to observe a difference in luminance due to the viewing angle.

(1) Woven Fabric

The woven fabric 20 is a fabric woven using warps and wefts, and has side emission optical fibers 25 woven in a line shape over the one end 20a side and the other end 20b side.

The number of the warps of the woven fabric 20 is 3,400. The number of the wefts of the woven fabric 20 is 310.

Among the wefts of the woven fabric 20, the proportion of the number of the optical fibers is 20%, and the optical fibers are side emission optical fibers having a core part made of polymethyl methacrylate and a clad part made of a fluorine-containing resin and having a thickness of 0.245 μm (about 600 dtex) wherein the resin clad part surrounds the outer periphery of the resin core part.

Among the wefts of the woven fabric 20, the proportion of the number of protective yarns ($D_E/D_F$=4) is 20%, and one protective yarn is arranged on each side of the two paralleled optical fibers 25.

(2) Light Source

A light source configured to be able to connect 110 optical fibers 25 to one LED (color temperature: 6,000 K; 130 lm at 359 mA; directional angle: 125 degrees).

(3) Measurement

A light emitting decoration 10 set so that the light source 30 was connected to the one end 20a side of the woven fabric 20 to guide light from the one end 20a side toward the other end 20b side in the optical fiber was provided.

Figure 9:
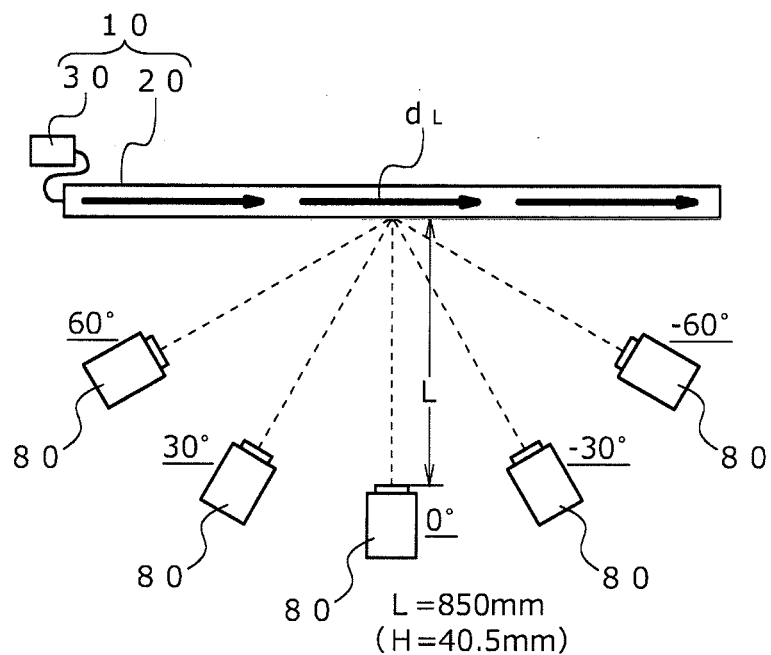
FIG. 9 is an explanatory view for explaining a testing method in Examples.

Luminance meters (manufactured by TOPCON CORPORATION, luminance chromaticity uniformity measuring device, Model "UA-1000A") 80 were placed at a separation distance of 850 mm (height from the floor surface: 40.5 mm) from a surface of the woven fabric 20 as shown in FIG. 9 (which shows a measurement state viewed from above) to measure the luminance (cd) when the position was changed to five places at measurement angles of 30 degrees, 60 degrees, 0 degree, −30 degree and −60 degree, respectively, in each of the case where 200 mA of current was made to flow to the light source 30 so as to guide light in the advancing direction $d_L$ in the optical fibers and the case where 350 mA of current was made to flow to the light source 30. Table 1 indicates the results.

TABLE 1

| | | Luminance (cd) | | | | |
|---|---|---|---|---|---|---|
| | | 60 degrees | 30 degrees | 0 degree | −30 degree | −60 degree |
| Current value | 350 mA | 2.30 | 0.87 | 1.75 | 4.70 | 17.2 |
| | 200 mA | 1.30 | 0.90 | 1.12 | 3.20 | 8.87 |

(4) Effect of Example

Figure 10:
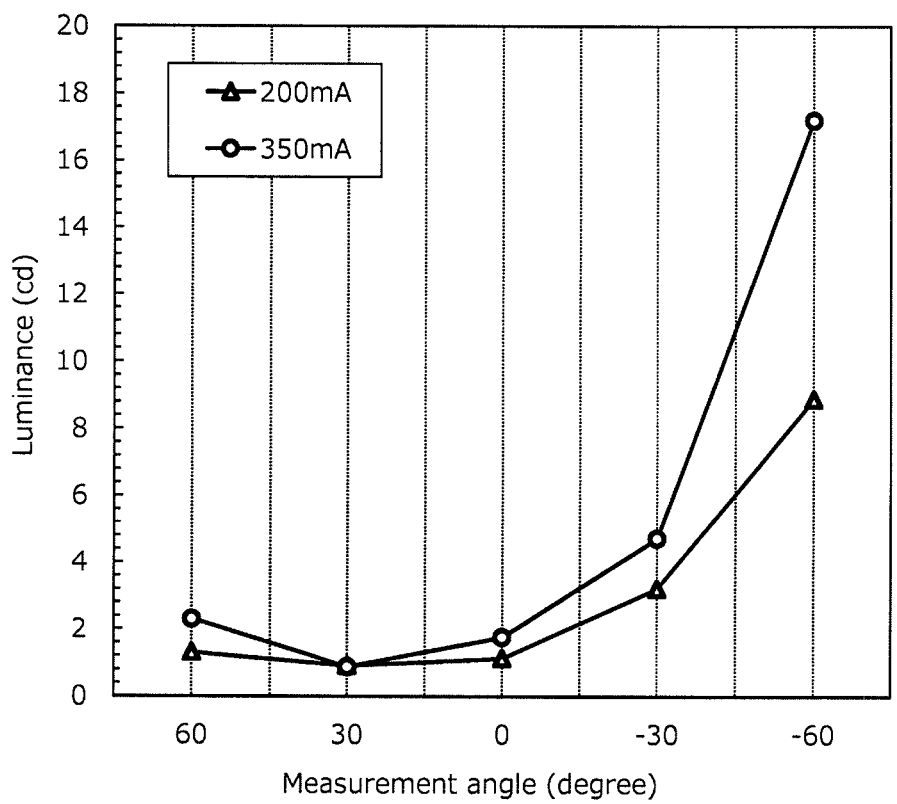
FIG. 10 is a graph showing the correlation between a measurement angle and a luminance.

From the results indicated in Table 1 and FIG. 10, it can be understood that rise in luminance is observed toward both ends from 30 degrees (30°), but that the asymmetry of the rise degree is great. Especially, when the measurement angle is opposite to the light advancing direction $d_L$ (−30 degree and −60 degree), a specifically great luminance is observed. From this fact, when a more vivid light emitting design is intended to be obtained with a small light source and a smaller output, it can be understood to be effective to lay the woven fabric so that the woven fabric is visually recognized at an angle within a range of 30 degrees or less to the light advancing direction $d_L$. In particular, when the luminance (17.2 cd) at an angle of −60 degree when the current value is 350 mA and the luminance (0.87 cd) at an angle of 30 degrees when the current value is 350 mA are compared with each other, the former reaches 19.8 times the latter.

Further, when the current value is 200 mA, the luminance at an angle of −60 degree is 6.8 times the luminance at an angle of 60 degrees. Contrary to this, when the current value is 350 mA, the luminance at −60 degree is 7.5 times the luminance at 60 degrees, which becomes greater. From this fact, it can be understood that, when the light emitting design is made to light more brightly, the viewing direction becomes more important accordingly. The angle of measurement by the luminance meters corresponds to the visual line direction $d_S$ described above.

In the results indicated in Table 1 and FIG. 10, it can be understood that, at the measurement angle of 30 degrees, only a luminance difference of 3% is obtained despite the fact that the current value is made greater, i.e., 1.75 times. Briefly, it can be recognized that the waste of energy is considerable when the light emitting design is observed in the visual line direction $d_S$ at an angle of 30 degrees along the light advancing direction $d_L$. Although the reason why such a result is obtained is unclear, it can be understood that the influence of the bending luminance rise caused by crimping of the optical fibers would be small. This is because, if the light leakage due to the bending luminance rise has influences, the luminance is considered to be raised in proportion to the current value.

Thus, from the results indicated in Table 1 and FIG. 10, it can be understood that a light emitting design is formed in consideration of the light advancing direction $d_L$ and the visual line direction $d_S$, thereby making it possible to provide a light emitting design having excellent visibility with less light emission source and energy consumed.

The light emitting decoration, laying object, method for laying a light emitting decoration, and method for forming a light emitting design according to the present invention are widely utilized in various fields of vehicles (such as automobiles and railroad vehicles), airplanes, ships, architecture and the like. Specifically, examples of interior materials include interior parts for a vehicle, for example, vehicle interior parts which exhibit a plate shape such as package boards (a luggage board and a deck board); trim parts such as a door trim, an arm rest, an upper trim, a decoration panel, an ornament panel, a lower trim, a pocket (a door trim pocket) and a quarter trim; a pillar garnish; a cowl side garnish (a cowl side trim); seat parts such as a side air bag peripheral part; instrumental panel parts such as a center cluster, a register, a center box (door), a grab door and an air bag peripheral part; a center console; an overhead console; a sun visor; a CRS cover; an under tray; a package tray; a seat side garnish; and a ceiling decoration.

As interior materials for architecture, they can be utilized, for example, in wall members, door members, various types of furniture (a desk, a chair, a shelf, a chest and the like), containers (such as a tray), protecting members and partition members.

Especially, the woven fabric in the light emitting decoration and laying object is utilized as design surfaces of these.

It is noted that the foregoing examples have been provided merely for the purpose of explanation and are in no way to be construed as limiting of the present invention. While the present invention has been described with reference to exemplary aspects, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and aspects, the present invention is not intended to be limited to the particulars disclosed herein; rather, the present invention extends to all functionally equivalent structures, methods and uses, such as are within the scope of the appended claims.

The present invention is not limited to the aspects described in detail above, and can be modified or changed in various manners within the scope as set forth in the claims of the present invention.

What is claimed is:

1. A light emitting decoration comprising:
    a woven fabric having a side emission optical fiber woven in a line from one end side to the other end side, and the woven fabric is visually recognized in a state where the other end side is located on the front side and the one end side is located on the back side; and
    a light source that introduces light to advance in a light advancing direction from the one end side toward the other end side in the optical fiber,
    wherein when a luminance of the optical fiber observed at a position substantially perpendicular to the light advancing direction is $L_0$, a luminance of the side emission optical fiber observed from a position at an angle of 30 degrees from a line substantially perpendicular to the light advancing direction toward the other end side is $L_{30}$, a luminance of the side emission optical fiber observed from a position at an angle of 60 degrees from the line substantially perpendicular to the light advancing direction toward the other end side is $L_{60}$, a luminance of the side emission optical fiber observed from a position at an angle of 60 degrees from the line substantially perpendicular to the light advancing direction toward the one end side is $L_{-60}$, the optical fiber satisfies $L_{-60}<L_{30}$ and $L_{30}/L_0<L_{60}/L_{30}$.

2. The light emitting decoration according to claim 1, wherein the optical fiber is a weft in the woven fabric.

3. The light emitting decoration according to claim 1, wherein the woven fabric is laid on a design surface of a door trim for a vehicle, and
    wherein the one end side is located on a front side of a vehicle and the other end side is located on a rear side of the vehicle.

4. The light emitting decoration according to claim 1, wherein the woven fabric is laid on a design surface of a ceiling for a vehicle, and
    wherein the one end side is located on a front side of a vehicle and the other end side is located on a rear side of the vehicle.

5. A laying object comprising a light emitting decoration laid thereon, the light emitting decoration comprising:
    a woven fabric having a side emission optical fiber woven in a line from one end side to the other end side; and
    a light source that introduces light to advance in an advancing direction from the one end side toward the other end side in the optical fiber,
    wherein the woven fabric is laid so that the woven fabric is visually recognized in a state where the other end side of the woven fabric is located on the front side and the one end side is located on the back side,
    wherein when a luminance of the optical fiber observed at a position substantially perpendicular to the light advancing direction is $L_0$, a luminance of the side emission optical fiber observed from a position at an angle of 30 degrees from a line substantially perpendicular to the light advancing direction toward the other end side is $L_{30}$, a luminance of the side emission optical fiber observed from a position at an angle of 60 degrees from the line substantially perpendicular to the light advancing direction toward the other end side is $L_{60}$, a luminance of the side emission optical fiber observed from a position at an angle of 60 degrees from the line substantially perpendicular to the light advancing direction toward the one end side is $L_{-60}$, the optical fiber satisfies $L_{-60}<L_{30}$ and $L_{30}/L_0<L_{60}/L_{30}$.

6. The laying object according to claim 5, wherein the optical fiber is a weft in the woven fabric.

7. The laying object according to claim 5,
    wherein the woven fabric is laid on a design surface of a door trim for a vehicle, and
    wherein the one end side is located on a front side of a vehicle and the other end side is located on a rear side of the vehicle.

8. The laying object according to claim 5,
    wherein the woven fabric is laid on a design surface of a ceiling for a vehicle, and
    wherein the one end side is located on a front side of a vehicle and the other end side is located on a rear side of the vehicle.

9. A method for laying a light emitting decoration, the light emitting decoration comprising:
    a woven fabric having a side emission optical fiber woven in a line from one end side to the other end side; and
    a light source that introduces light to advance in an advancing direction from the one end side toward the other end side in the optical fiber,
    the method comprising laying the woven fabric so that the woven fabric is visually recognized in a state where the other end side of the woven fabric is located on the front side and the one end side is located on the back side,
    wherein when a luminance of the optical fiber observed at a position substantially perpendicular to the light advancing direction is $L_0$, a luminance of the side emission optical fiber observed from a position at an angle of 30 degrees from a line substantially perpendicular to the light advancing direction toward the other end side is $L_{30}$, a luminance of the side emission optical fiber observed from a position at an angle of 60 degrees from the line substantially perpendicular to the light advancing direction toward the other end side is $L_{60}$, a luminance of the side emission optical fiber observed from a position at an angle of 60 degrees from the line substantially perpendicular to the light advancing direction toward the one end side is $L_{-60}$, the optical fiber satisfies $L_{-60}<L_{30}$ and $L_{30}/L_0<L_{60}/L_{30}$.

10. The method for laying a light emitting decoration according to claim 9, wherein the optical fiber is a weft in the woven fabric.

11. The method for laying a light emitting decoration according to claim 9, wherein the woven fabric is laid on a design surface of a door trim for a vehicle so that the one end side is located on a front side of a vehicle, and that the other end side is located on a rear side of the vehicle.

12. The method for laying a light emitting decoration according to claim 9, wherein the woven fabric is laid on a design surface of a ceiling for a vehicle so that the one end side is located on a front side of a vehicle, and that the other end side is located on a rear side of the vehicle.

13. A method for forming a light emitting design using a woven fabric having a side emission optical fiber woven in a line from one end side to the other end side,
the method comprising introducing light in the optical fiber so that the light advances in an advancing direction from the one end side toward the other end side when the light emitting design is visually recognized in a state where the other end side of the woven fabric is located on the front side and the one end side thereof is located on the back side,
wherein when a luminance of the optical fiber observed at a position substantially perpendicular to the light advancing direction is $L_0$, a luminance of the side emission optical fiber observed from a position at an angle of 30 degrees from a line substantially perpendicular to the light advancing direction toward the other end side is $L_{30}$, a luminance of the side emission optical fiber observed from a position at an angle of 60 degrees from the line substantially perpendicular to the light advancing direction toward the other end side is $L_{60}$, a luminance of the side emission optical fiber observed from a position at an angle of 60 degrees from the line substantially perpendicular to the light advancing direction toward the end side is $L_{-60}$, the optical fiber satisfies $L_{-60}<L_{30}$ and $L_{30}/L_0<L_{60}/L_{30}$.

14. The method for forming a light emitting design according to claim 13, wherein the optical fiber is a weft in the woven fabric.

15. The method for forming a light emitting design according to claim 13,
wherein the woven fabric is laid on a design surface of a door trim for a vehicle, and
wherein the one end side is located on a front side of a vehicle and the other end side is located on a rear side of the vehicle.

16. The method for forming a light emitting design according to claim 13,
wherein the woven fabric is laid on a design surface of a ceiling for a vehicle, and
wherein the one end side is located on a front side of a vehicle and the other end side is located on a rear side of the vehicle.

* * * * *